May 30, 1967 T. ALFREY, JR., ET AL 3,322,695
PREPARATION OF POROUS STRUCTURES
Filed July 1, 1966
INVENTORS.
Turner Alfrey, Jr.
William G. Lloyd
BY
AGENT

United States Patent Office 3,322,695
Patented May 30, 1967

3,322,695
PREPARATION OF POROUS STRUCTURES
Turner Alfrey, Jr., Midland, Mich., and William G. Lloyd, Dover, N.J., assignors to The Dow Chemical Company, Midland, Mich., a corporation of Delaware
Filed July 1, 1966, Ser. No. 563,634
6 Claims. (Cl. 260—2.5)

This application is a continuation-in-part of copending application Ser. No. 253,084 filed Jan. 22, 1963 now abandoned.

This invention relates to the preparation of porous structures. It more particularly relates to a method of preparing microporous synthetic resinous materials.

A wide variety of cellular and permeable polymeric materials are known which are formed oftentimes by polymerization into a generally porous structure or frequently are prepared by incorporating within a resinous material either after or during its formation an agent which will generate a gas and cause a plurality of interconnecting pores or passages within the polymeric body. Other methods are known which include polymerizing a resinous material in the presence of a particulate solid which may at a later time if desired be dissolved, leaving a resinous structure with interconnecting pores. Such particulate material may be incorporated into thermoplastic bodies by milling and similar mixing procedures and the porous body subsequently generated by dissolving away the solid material. By employing certain liquids which are incompatible or non-solvents for the polymeric material, oftentimes the porous bodies can be generated by polymerizing in the presence of such liquids.

The foregoing methods do not provide a means of controlling the pore size of the porous particles, particularly within a high range of pore sizes below about 10 microns. Such resinous materials having extremely small pore size, that is, having pores ranging in size from about 20 Angstroms to about 1 micron in diameter are particularly beneficial and advantageous for use in the separation of solutions into their various components by selective absorption.

It is an object of this invention to provide a method of controlling the pore size of synthetic resinous materials during their polymerization.

It is a further object of this invention to provide a method of polymerizing a monomeric material into a resinous material having an average predetermined pore diameter.

It is a further object of this invention to utilize selective solvents for preparing polymer bodies of predetermined porosity.

These benefits and other advantages in accordance with the invention are readily achieved by polymerizing an organic material in admixture with from about ½ to about 20 times the weight of the material of a solvent which is miscible with the unpolymerized material and exhibits limited solubility for the polymeric form of the material, thereby forming a rigid cross-linked polymeric body having a plurality of interconnecting pores therein.

The structure of the polymers in accordance with the invention may be readily understood by reference to the drawing wherein:

The figure depicts an enlarged view of a portion of a polymer body prepared in accordance with the invention wherein the reference character A refers to the portions of the polymer body and B designates the voids or spaces therebetween.

A wide variety of monofunctional olefinically unsaturated polymerizable materials, including monovinyl materials may be employed in the practice of the present invention. Particularly advantageous are the alkenyl aromatic monomers. By the term alkenyl aromatic is meant an alkenyl aromatic compound having the general formula:

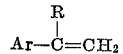

wherein Ar represents an aromatic hydrocarbon radical, or an aromatic halohydrocarbon radical of the benzene series, and R is hydrogen or the methyl radical. Examples of such alkenyl aromatic monomers are styrene, α-methylstyrene, ortho-methylstyrene, meta-methylstyrene, para-methylstyrene, ar-ethylstyrene, ar-vinylxylene, ar-chlorostyrene, or ar-bromostyrene and the like.

The acrylate monomers alone or in combination with the alkenyl aromatic monomers may also be utilized. Such acrylate-type monomers include monomers of the formula:

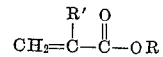

wherein R is selected from the group consisting of hydrogen and an alkyl radical containing from about 1 to 12 carbon atoms and R' is selected from the group consisting of hydrogen and methyl. Typical acrylate materials which may be used are methyl methacrylate, ethyl acrylate, propyl acrylate, butyl acrylate, butyl methacrylate, propyl methacrylate, lauryl acrylate, 2-ethylhexylacrylate, ethyl methacrylate and the like. Copolymers of vinyl chloride and vinylidene chloride, acrylonitrile with vinyl chloride, vinyl bromide, and similar halogenated vinyl compounds may be prepared by the process of the invention. Esters, such as vinyl esters having the formula:

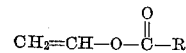

wherein R is an alkyl radical containing from 2 to 18 carbon atoms, may also frequently be employed with benefit. Typical monomers falling within this classification are vinyl acetate, vinyl butyrate, vinyl stearate, vinyl laurate, vinyl myristate, vinyl propionate, and the like.

Typical copolymerizable acids are acrylic acid, methacrylic acid, itaconic acid, citraconic acid, maleic acid, fumaric acid, oleic acid, vinylbenzoic acid, and the like.

Advantageously the synthetic polyester resins which are prepared by reacting terephthalic acid and dialkyl terephthalics or ester-forming derivatives thereof, with a glycol of the series $HO(CH_2)_nOH$, where $n$ is a whole number within the range of 2–10 and having reactive olefinic linkages within the polymer molecule, are readily utilized in the practice of the invention. Such polyesters also may include copolymerized therein up to 20 percent by weight of a second acid or ester thereof having reactive olefinic unsaturation such as fumaric acid, maleic acid, itaconic acid, tetrahydrophthalic acid, and the like. Polyesters containing olefinic unsaturation are readily reacted with monomeric olefinic materials such as the alkenyl aromatic monomers of the general formula:

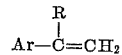

wherein Ar represents an aromatic hydrocarbon radical, or aromatic halohydrocarbon radical of the benzene series, and R is hydrogen or the methyl radical. Examples of alkenyl aromatic monomers are styrene, α-methylstyrene, ortho-methylstyrene, meta-methylstyrene, para-methylstyrene, ar-ethylstyrene, ar-vinylxylene, ar-chlorostyrene, and ar-bromostyrene; beneficially, if desired, other olefinically unsaturated polymerizable monomeric materials may be utilized such as acrylates and methacrylates, acrylonitrile, divinylbenzene, vinyl acetate, vinyl butyrate, and the like.

A number of polyfunctional olefinically unsaturated or difunctional monomeric constituents are readily employed in the invention. Advantageously, with the vinyl or alkenyl aromatic type monomers, suitable difunctional cross linking agents as divinylbenzene, diethylene glycol dimethacrylate, diallyl fumarate, diallyl phthalate, and the like are readily utilized.

The porous polymers prepared according to the method of the present invention are preferably prepared utilizing at least 10 mole percent of a cross linking agent when vinyl or vinylidene type monomers are used. It is essential that the desired product be provided with sufficient cross linking in the polymer to prevent significant swelling thereof in the presence of solvent. Such swelling closes or reduces the dimensions of the pores in many cases to the point where the product loses its desirable characteristics. Further any polymer which shows insufficient cross linking is oftentimes sufficiently soft that it will pack, deform and if being used for filtration or similar purposes, will transmit little or none of the material which is being passed therethrough.

Accordingly, the choice of solvents is equally wide depending upon the particular monomer system that is utilized for the production of the porous polymeric material. The solvent should not be such a good solvent for the polymer that it is completely miscible in all proportions, nor should the solvent be a material which is a non-solvent for the monomer. Generally materials which are completely soluble result in a polymer product which has no apparent pore size and is simply swollen by the solvent whereas polymeric materials produced by the use of non-solvents result in a pore size that is much too large for such operations as the selective absorption and the like. Suitable solvents for the practice of the invention are readily prepared by admixing the solvents and non-solvents or alternately by selecting a suitable solvent having the desired characteristics. Usually for convenience and economy it is preferable to employ a mixture of solvents, i.e., a solvent and non-solvent which will result in the desired product.

Suitable solvent mixtures are readily determined for the preparation of specific polymer systems by use of the relationship: $\delta = \delta_0 \pm 0.8$ wherein $\delta$ is the solubility parameter for the solvent system and $\delta_0$ is the solubility parameter for the polymer.[1] The solubility parameters are discussed in "Some Factors Affecting the Solubility of Polymers" by P. A. Small, Journal of Applied Chemistry 3, 71 (1953) and also by Harry Burnell in the "Interchemical Review" 14, 3–16, 31–46 (1955). For mixed solvents the value of $\delta$ is readily calculated by additive averaging on a weight basis. The same technique is also used to determine $\delta_0$ for copolymers including those which are highly cross linked, insoluble and non-swellable. Some typical values for $\delta_0$ are: polystyrene, 9.1; polydivinyl benzene, 8.8; polymethyl methacrylate, 9.3; polyethyl methacrylate, 9.1; poly n propyl methacrylate, 8.9; poly n butyl methacrylate, 8.7; polymethyl acrylate, 9.7; polyethyl acrylate, 9.2; polybutyl acrylate, 8.7; polyvinyl acetate, 9.4; polyethylene dimethacrylate, 9.2; polyethylene diacrylate, 9.5.

Particularly beneficial and advantageous in the practice of the present invention utilizing alkenyl aromatic monomers such as styrene are solvent or diluent mixtures which have a cohesive energy density of from about 65 to 85 and beneficially between about 70 and 75. The cohesive energy density (c.e.d.) is $$\frac{\Delta H_{vap} - RT}{V}$$

wherein $\Delta H_{vap}$ is the molar heat of vaporization, R is the gas constant, T is temperature in degrees Kelvin and V is the molar volume (c.e.d.$=\delta^2$). Solvents or solvent mixtures having a cohesive energy density approaching 80 to 85 when used with alkenyl aromatic resinous polymers such as styrene-divinylbenzene copolymers give

TABLE I.—APPEARANCES OF POROUS NETWORK POLYMERS

| Mole Percent DVB | Diluent/ Monomer | Toluene, vol. percent | Other Diluent | Visual Appearance | Micrograph Appearance | $\delta$ | $\delta_0$ |
|---|---|---|---|---|---|---|---|
| 5.0 | 2:1 | Nil | Octane | Opaque wh | ~10 microns | 7.6 | 9.1 |
| 5.0 | 2:1 | 25 | do | do | ~1 micron | 8.0 | 9.1 |
| 5.0 | 2:1 | 50 | do | do | <0.1 micron | 8.3 | 9.1 |
| 5.0 | 2:1 | 75 | do | Clear | Very fine | 8.6 | 9.1 |
| 5.0 | 2:1 | 100 | | do | do | 8.9 | 9.1 |
| 5.0 | 2:1 | 75 | MEK | do | do | 9.0 | 9.1 |
| 5.0 | 2:1 | 50 | MEK | do | do | 9.1 | 9.1 |
| 5.0 | 2:1 | 25 | MEK | Foggy | do | 9.2 | 9.1 |
| 5.0 | 2:1 | Nil | MEK | Opaque wh | <0.1 micron | 9.3 | 9.1 | rise to very fine porous networks, whereas solvents or solvent mixtures having cohesive energy densities approaching 65 result in relatively coarse porous networks.

In general as the value of $\delta$ approaches that of $\delta_0$, the pore size of the polymer decreases and as these values diverge the pore size becomes greater.

Polymers prepared in accordance with the method of the present invention may be made by mass polymerization of the solvent-polymerizable material mixture or the mixture may be disposed in the form of droplets in a suitable heat transfer medium.

The present invention is further illustrated, but not limited, by the following examples.

EXAMPLE I

Reaction vessels were charged with suitable amounts of styrene and divinyl benzene inert liquid diluents wherein the relationship $\delta = \delta_0 \pm 0.8$ was maintained for the majority of the samples and 0.100 percent benzoyl peroxide based on the total weight of the monomer charged. The reaction vessels were charged with nitrogen in sufficient quantity to remove at least a major portion of air present, were then sealed and placed in temperature controlled liquid baths. After a suitable polymerization period the reaction vessels were opened and the porous polymer samples removed. Portions of the resulting polymers were taken for measurement of various physical properties and examination under an electron microscope. Electron microscope pore size was confirmed by means of an Aminco-Winslow mercury porosimeter. The polymer to be evaluated was cut into a suitable section, immersed in methylene chloride for a sufficient period to remove the original diluent therefrom and vacuum devolatilized for period of 24 hours at 50° centigrade prior to determinations. Pressures up to 2000 pounds per square inch were utilized. The results are set forth in Table I.

The polymerization schedule used for the samples of Table I was 75° centigrade for 24 hours, 85° centigrade for 48 hours, 110° centigrade for 48 hours and 120° centigrade for 48 hours.

---

[1] Desirable porous polymers are obtained when the solubility parameter falls within the above range.

EXAMPLE II

In a manner similar to Example I further samples were prepared using a polymerization schedule of 70, 80, 90, 100, and 120° with 48 hours intervals at each temperature. The relationship results are set forth in Table II.

TABLE II.—APPEARANCES OF POROUS NETWORK POLYMERS

| Mole Percent DVB | Diluent/ Monomer | Toluene, vol. percent | Other Diluent | Visual Appearance | Micrograph Appearance | $\delta$ | $\delta_0$ |
|---|---|---|---|---|---|---|---|
| 21.4 | 2:1 | 100 | | Translucent | <0.1 micron | 8.9 | 9.0 |
| 21.4 | 2:1 | Nil | Octane | Opaque wh | ~10 microns | 7.6 | 9.0 |
| 44.7 | 2:1 | 100 | | Translucent | <0.1 micron | 8.9 | 8.9 |
| 44.7 | 2:1 | 50 | Octane | Opaque wh | <0.1 micron | 8.3 | 8.9 |
| 44.7 | 2:1 | 25 | do | do | ~0.1 micron | 8.0 | 8.9 |
| 44.7 | 2:1 | 20 | do | do | ~0.1 micron | 7.9 | 8.9 |
| 44.7 | 2:1 | 10 | do | do | ~1 micron | 7.7 | 8.9 |
| 44.7 | 2:1 | Nil | do | do | 1-3 microns | 7.6 | 8.9 |
| 44.7 | 0.5:1 | 100 | | Clear | <0.1 micron | 8.9 | 8.9 |
| 44.7 | 1:1 | 100 | | Translucent | ~0.1 micron | 8.9 | 8.9 |
| 44.7 | 3:1 | 100 | | Opaque wh | ~0.1 micron | 8.9 | 8.9 |
| 44.7 | 0.5:1 | Nil | Octane | do | ~1 micron | 7.6 | 8.9 |
| 44.7 | 1:1 | Nil | do | do | 1-2 microns | 7.6 | 8.9 |
| 44.7 | 3:1 | Nil | do | do | ~10 microns | 7.6 | 8.9 |
| 70.3 | 2:1 | 100 | | | 0.1-0.3 micron | 8.9 | 8.8 |
| 70.3 | 2:1 | Nil | Octane | Opaque wh | ~1 micron | 7.6 | 8.8 |

EXAMPLE III

In a manner similar to Example I, a plurality of samples were prepared using various diluents. The polymerization schedule was 75° centigrade for 29 hours, 80° centigrade for 40 hours, 85° centigrade for 24 hours, 103° centigrade for 48 hours, and 115° centigrade for 48 hours. The results are set forth in Table III.

TABLE III.—APPEARANCES OF POROUS NETWORK POLYMERS [a]

| Diluents | Visual Appearance | Micrograph Appearance | $\delta$ |
|---|---|---|---|
| Pyridine only | Opaque tan | 3 microns | 10.9 |
| Pyridine 34%-Ethylcyclohexane 66% | Foggy | Irregular | 9.1 |
| Pyridine 17%-Ethylcyclohexane 83% | Clear | Very fine | 8.5 |
| Pyridine 8½%-Ethylcyclohexane 91½% | Foggy | 0.1 microns | 8.3 |
| Ethylcyclohexane only | Opaque | 0.3 microns | 8 |
| Dioxane only | Clear | Very fine | 9.9 |
| Dioxane 34%-Acetone 66% | Foggy | do | 10 |
| Dioxane 17%-Acetone 83% | Opaque | 0.1 micron | 10 |
| Dioxane 8½%-Acetone 91½% | do | 0.3 micron | 10 |
| Acetone only | do | 0.3-1.0 microns | 10 |

[a] All 95 mole percent styrene-5.0 mole percent divinylbenzene, with two volumes diluent per volume monomer mixture. $\delta_0$ 9.1.

EXAMPLE IV

In a manner similar to Example I, a number of samples were prepared utilizing a polymer schedule of 60° centigrade for 24 hours, 70° centigrade for 48 hours, 80° centigrade for 48 hours, 90° centigrade for 48 hours, 110° centigrade for 24 hours, and 120° centigrade for 24 hours. The results are set forth in Table IV.

EXAMPLE V

A vessel was charged with 25 parts of styrene, 8.3 parts of divinyl benzene, 0.067 part of benzoyl peroxide, 66.6 parts of a 1:1 mixture of toluene and octane ($\delta=8.3$, $\delta_0=9$), 105 parts of an aqueous solution containing 4.5 parts of colloidal silica, 0.0025 part of potassium dichromate and 0.2 part of the condensation product of a 1:1 molar mixture of diethanol amine and adipic acid. The aqueous solution was adjusted to a pH of 4.0 with hydrochloric acid. The contents of the vessel were then intimately admixed with high shear agitation until a uniform dispersion was obtained. The reaction mixture was then heated to a temperature of 80° centigrade for a period of 20 hours and gentle agitation maintained. At the end of this time the contents were filtered and the product was microporous beads having an average diameter of about 5 microns.

The porous polymers of the foregoing examples were found to have a surface generally in accordance with their pore size and were capable of absorbing relatively large quantities of solutes from solutions, and when tightly compacted or prepared in the form of a continuous body, acted very satisfactorily as microporous filters for the separation of finely dispersed solids from gases and liquids and also molecular sieves. The porous polymers having pore sizes of about 0.1 micron and smaller are prepared by maintaining the relationship $\delta=\delta_0\pm0.8$.

In a manner similar to the foregoing examples, copolymers of various acrylate and methacrylate monomers copolymerizable acids, acrylic esters, vinyl copolymers such as vinyl chloride, vinylidene chloride, epoxy resin compositions as well as polyesters are readily prepared in the form of microporous polymers. Porous polymers having pore sizes of less than about 0.1 micron are prepared by copolymerizing 90 mole percent of ethyl acrylate with 10 mole percent of diallyl fumarate in the presence of about 200 volume percent based on the volume of the monomers of chloroform. Somewhat similar beneficial

TABLE IV.—APPEARANCES OF POROUS NETWORK POLYMERS

| Monomers [a] | Diluents | Visual Appearance | Micrograph appearance | $\delta$ | $\delta_0$ |
|---|---|---|---|---|---|
| p-Tert-butylstyrene and DVB. | p-Cymene only | Clear | Fine | 8.5 | 8.6 |
| | p-Cymene 50%-MeOH 50% | Opaque | Very coarse | 11.4 | 8.6 |
| | p-Cymene 25%-MeOH 75% | do | do | 12.9 | 8.6 |
| | MeOH only | do | do | 14.5 | 8.6 |
| Ethyl methacrylate and ethylene glycol dimethacrylate. | Ethyl acetate only | Clear | Very fine | 9.1 | 9.1 |
| | EtOAc 75%-octane 25% | do | do | 8.8 | 9.1 |
| | EtOAc 50%-octane 50% | do | do | 8.4 | 9.1 |
| | EtOAc 25%-octane 75% | Opaque | Indeterminate | 8.1 | 9.1 |
| | Octane only | do | Very coarse | 7.6 | 9.1 |

[a] All 95 mole percent monovinyl monomer and 5 mole percent divinyl monomer, with two volumes diluent per volume monomer mixture.

porous copolymers are prepared by copolymerizing 50 parts by weight of acrylonitrile, 50 parts by weight of vinylidene chloride with 10 parts by weight of diethylene glycol dimethacrylate in the presence of 300 volume percent ethylene glycol. Generally similar porous polymers are readily prepared by copolymerizing 70 parts of vinyl chloride, 30 parts vinyl acetate and 10 parts of diallyl fumarate in the presence of 250 volume percent of propyl acetate. In a similar manner porous polymers may be readily prepared by reacting such diepoxy compounds as the diglycidyl ether of Bisphenol A with polyhydroxy compounds such as glycerine in the presence of a solvent wherein $\delta = \delta_0 \pm 0.8$ wherein $\delta$ and $\delta_0$ are obtained in accordance with the previously cited references. Also porous polymers are readily prepared from polyester resins such as are prepared by the condensation of stoichiometric equivalents of phthalic acid and glycerine in the presence of a solvent where the relationship $\delta = \delta_0 \pm 0.8$ is maintained.

As is apparent from the foregoing specification, the method of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. The method of preparing a porous polymer comprising polymerizing polymerizable organic material which is a member selected from the group consisting of an alkenyl aromatic compound having the general formula

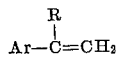

wherein Ar represents an aromatic hydrocarbon radical, or an aromatic halohydracarbon radical of the benzene series, and R is hydrogen or the methyl radical; acrylate-type monomers include monomers of the formula

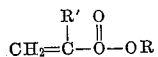

wherein R is selected from the group consisting of hydrogen and an alkyl radical containing from about 1 to 12 carbon atoms and R' is selected from the group consisting of hydrogen and methyl; copolymers of vinyl chloride and vinylidene chloride, acrylonitrile and vinyl chloride, vinyl bromide, vinyl esters having the formula

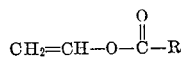

wherein R is an alkyl radical containing from 2 to 18 carbon atoms; acrylic acid, methacrylic acid, itaconic acid, citraconic acid, maleic acid, fumaric acid, oleic acid, vinylbenzoic acid; the synthetic polyester resins which are prepared by reacting terephthalic acid and dialkyl terephthalics or ester-forming derivatives thereof, with a glycol of the series $HO(CH_2)_nOH$, wherein $n$ is a whole number within the range of 2–10 and having reactive olefinic linkages within the polymer molecule, the hereinabove described polyesters which include copolymerized therein up to 20 percent by weight of a second acid or ester thereof having reactive olefinic unsaturation and mixtures thereof, and at least 10 mole percent of a cross-linking agent selected from the group consisting of divinylbenzene, diethylene glycol dimethacrylate, diallyl fumarate, diallyl phthalate and mixtures thereof, to a rigid cross-linked polymer body having a plurality of interconnecting pores therein in a solvent, the solvent being in a proportion of from about one-half to about twenty times the weight of the polymerizable mixture wherein the following relationship exists: $\delta = \delta_0 \pm 0.8$, where $\delta$ is the solubility parameter of the solvent and $\delta_0$ is the solubility parameter of the polymer.

2. The method of claim 1, wherein the vinyl material is styrene.

3. The method of claim 2, wherein the cross-linking agent is divinylbenzene.

4. The method of claim 3 wherein the cohesive energy density of the solvent is from about 70 to about 75.

5. The method of claim 1, wherein the solvent is present in a proportion of from about 1 to 5 times the weight of the polymerizable materials.

6. The method of claim 1, wherein the polymerizable material is prepared in the form of beads by a suspension polymerization technique.

References Cited

UNITED STATES PATENTS

| | | | |
|---|---|---|---|
| 2,744,291 | 5/1956 | Stastny et al. | 260—2.5 |
| 2,848,428 | 8/1958 | Rubens | 260—2.5 |
| 3,018,257 | 1/1962 | Spencer | 260—2.5 |

MURRAY TILLMAN, *Primary Examiner.*

J. C. BLEUTGE, *Assistant Examiner.*